(12) United States Patent
Uehara et al.

(10) Patent No.: US 10,975,984 B2
(45) Date of Patent: Apr. 13, 2021

(54) ELECTRICALLY OPERATED VALVE

(71) Applicant: Fujikoki Corporation, Tokyo (JP)

(72) Inventors: Satoshi Uehara, Tokyo (JP); Yusuke Arai, Tokyo (JP); Takeshi Hosoya, Tokyo (JP)

(73) Assignee: FUJIKOKI CORPORATION, Tokyo (JP)

( * ) Notice: Subject to any disclaimer, the term of this patent is extended or adjusted under 35 U.S.C. 154(b) by 0 days.

(21) Appl. No.: 16/492,424

(22) PCT Filed: Feb. 21, 2018

(86) PCT No.: PCT/JP2018/006233
§ 371 (c)(1),
(2) Date: Sep. 9, 2019

(87) PCT Pub. No.: WO2018/180041
PCT Pub. Date: Oct. 4, 2018

(65) Prior Publication Data
US 2020/0041020 A1 Feb. 6, 2020

(30) Foreign Application Priority Data
Mar. 31, 2017 (JP) .............................. JP2017-070366

(51) Int. Cl.
*F16K 37/00* (2006.01)
*F16K 31/04* (2006.01)

(52) U.S. Cl.
CPC ........ *F16K 37/0041* (2013.01); *F16K 31/046* (2013.01); *F16K 31/047* (2013.01); *F16K 37/0033* (2013.01); *Y10T 137/8242* (2015.04)

(58) Field of Classification Search
CPC ............. F16K 37/0033; F16K 37/0041; F16K 31/047; Y10T 137/8242; G01D 5/145; F01L 2009/0469
See application file for complete search history.

(56) References Cited

U.S. PATENT DOCUMENTS 5,316,263 A  5/1994 Mino
6,561,480 B1  5/2003 Komiya et al.
(Continued)

FOREIGN PATENT DOCUMENTS

DE  102016204151 A1  10/2016
EP     1391598 A2   2/2004
(Continued)

OTHER PUBLICATIONS

International Search Report dated May 29, 2018 for PCT/JP2018/006233 and English translation.

(Continued)

*Primary Examiner* — Atif H Chaudry
(74) *Attorney, Agent, or Firm* — Lucas & Mercanti, LLP

(57) ABSTRACT

An object of the present invention is to provide an electrically operated valve capable of more accurately detecting the position of a valve body.

In order to achieve the above object, the electrically operated valve of the present invention comprises a valve body, a driver configured to move the valve body along a first axis, a rotation shaft configured to rotate the driver around the first axis, a permanent magnet member, an angle sensor, and a yoke configured to cover a portion of the permanent magnet or a portion of the angle sensor. The permanent magnet member is disposed on the rotation shaft and configured to rotate with the rotation shaft. The angle sensor is configured to detect a rotation angle of a permanent magnet included in the permanent magnet member. The angle sensor is disposed above the permanent magnet.

8 Claims, 16 Drawing Sheets

(56) References Cited

U.S. PATENT DOCUMENTS

| | | | |
|---|---|---|---|
| 2005/0000580 A1* | 1/2005 | Tranovich | F15B 13/0444 |
| | | | 137/625.65 |
| 2005/0028871 A1 | 2/2005 | Kurita et al. | |
| 2008/0164867 A1* | 7/2008 | Steinich | G01D 11/245 |
| | | | 324/207.2 |
| 2009/0123098 A1 | 5/2009 | Takahashi | |
| 2009/0151436 A1 | 6/2009 | Nagahori et al. | |
| 2012/0169325 A1 | 7/2012 | Iwahashi | |
| 2012/0248355 A1 | 10/2012 | Harada et al. | |
| 2014/0231684 A1 | 8/2014 | Shimura et al. | |
| 2014/0368192 A1 | 12/2014 | Kaneko et al. | |
| 2015/0160042 A1 | 6/2015 | Bogos et al. | |
| 2015/0226581 A1 | 8/2015 | Schott et al. | |
| 2015/0323346 A1* | 11/2015 | Maiterth | G01D 5/14 |
| | | | 324/207.22 |
| 2016/0285331 A1 | 9/2016 | Ichikawa et al. | |
| 2018/0180497 A1 | 6/2018 | Nishiguchi et al. | |

FOREIGN PATENT DOCUMENTS

| | | |
|---|---|---|
| JP | H08-326952 A | 12/1996 |
| JP | 2001012633 A | 1/2001 |
| JP | 2005-054654 A | 3/2005 |
| JP | 2006-233985 A | 9/2006 |
| JP | 2008215942 A | 9/2008 |
| JP | 2009145293 A | 7/2009 |
| JP | 2014161152 A | 9/2014 |
| JP | 2016090499 A | 5/2016 |
| JP | 2018-511759 A | 4/2018 |
| WO | 2016/091941 A1 | 6/2016 |

OTHER PUBLICATIONS

Written Opinion of ISA dated May 29, 2018 for PCT/JP2018/006233 (Japanese only).

JPO, Submission of Publications for the corresponding Japanese application No. 2017-070366, submitted on Nov. 19, 2019, with machine generated English translation.

Office Action for the corresponding Japanese Patent Application No. 2017-070366 dated Jun. 30, 2020, with English machine generated translation obtained from the Global Dossier.

Office Action for the corresponding Chinese Patent Application No. 201880022103.4 dated Jul. 31, 2020, with English machine generated translation obtained from the Global Dossier.

International Search Report for the related application PCT/JP2018/002925, dated May 1, 2018, and English translation.

JPO, Office Action for the related Japanese patent application No. 2017-029192, dated Mar. 3, 2020, with machine-generated English translation.

CNIPA, Office Action for the related Chinese patent application No. 201880012990.7, dated Jun. 18, 2020, with machine-generated English translation.

KIPO, Office Action for the related Korean patent application No. 10-2019-7023112, dated Aug. 6, 2020, with machine-generated English translation.

KIPO, Office Action for the corresponding Korean patent application No. 10-2019-7027317, dated Oct. 1, 2020, with machine-generated English translation.

EPO, Extended European Search Report for the corresponding European application No. 18774675.5, dated Nov. 13, 2020.

* cited by examiner

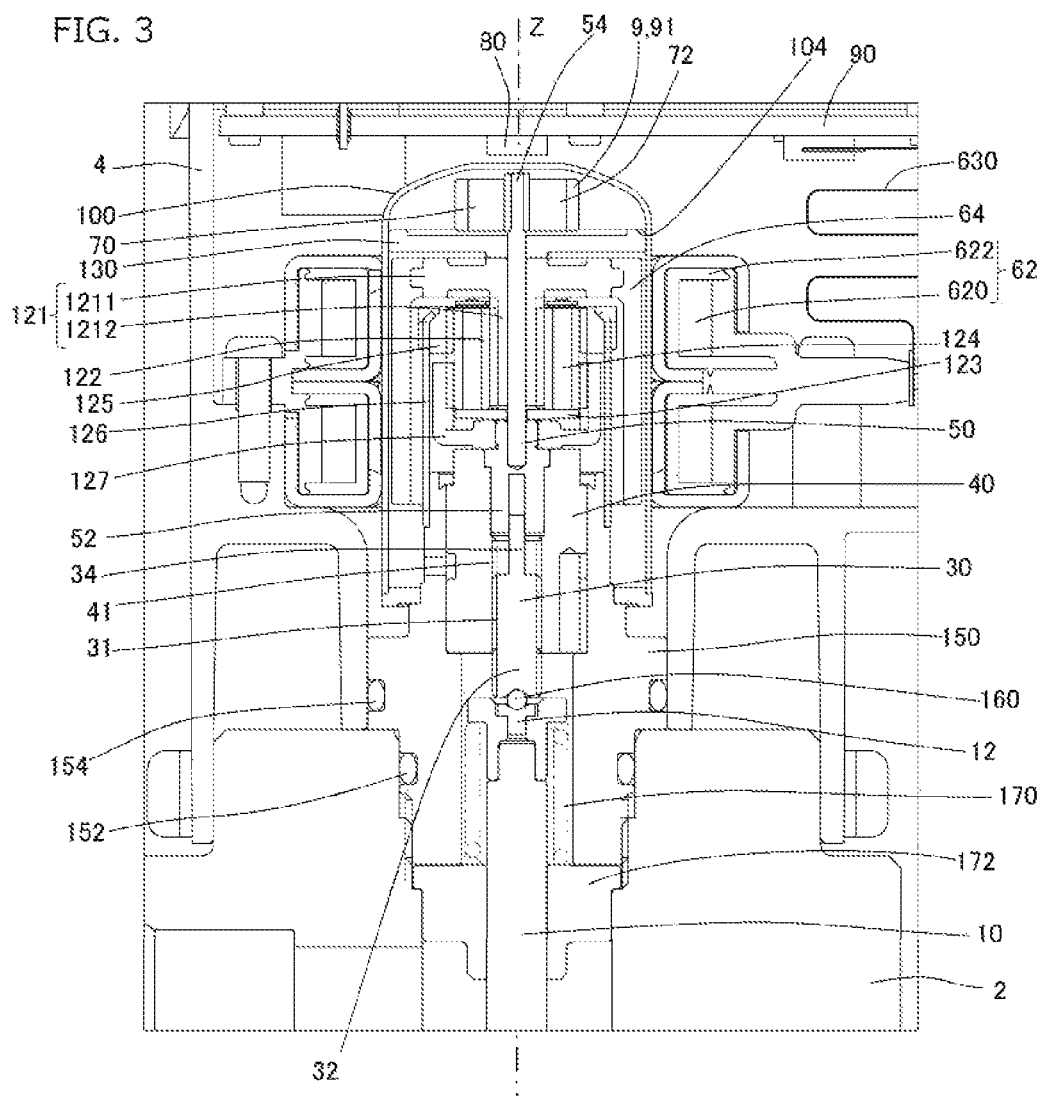

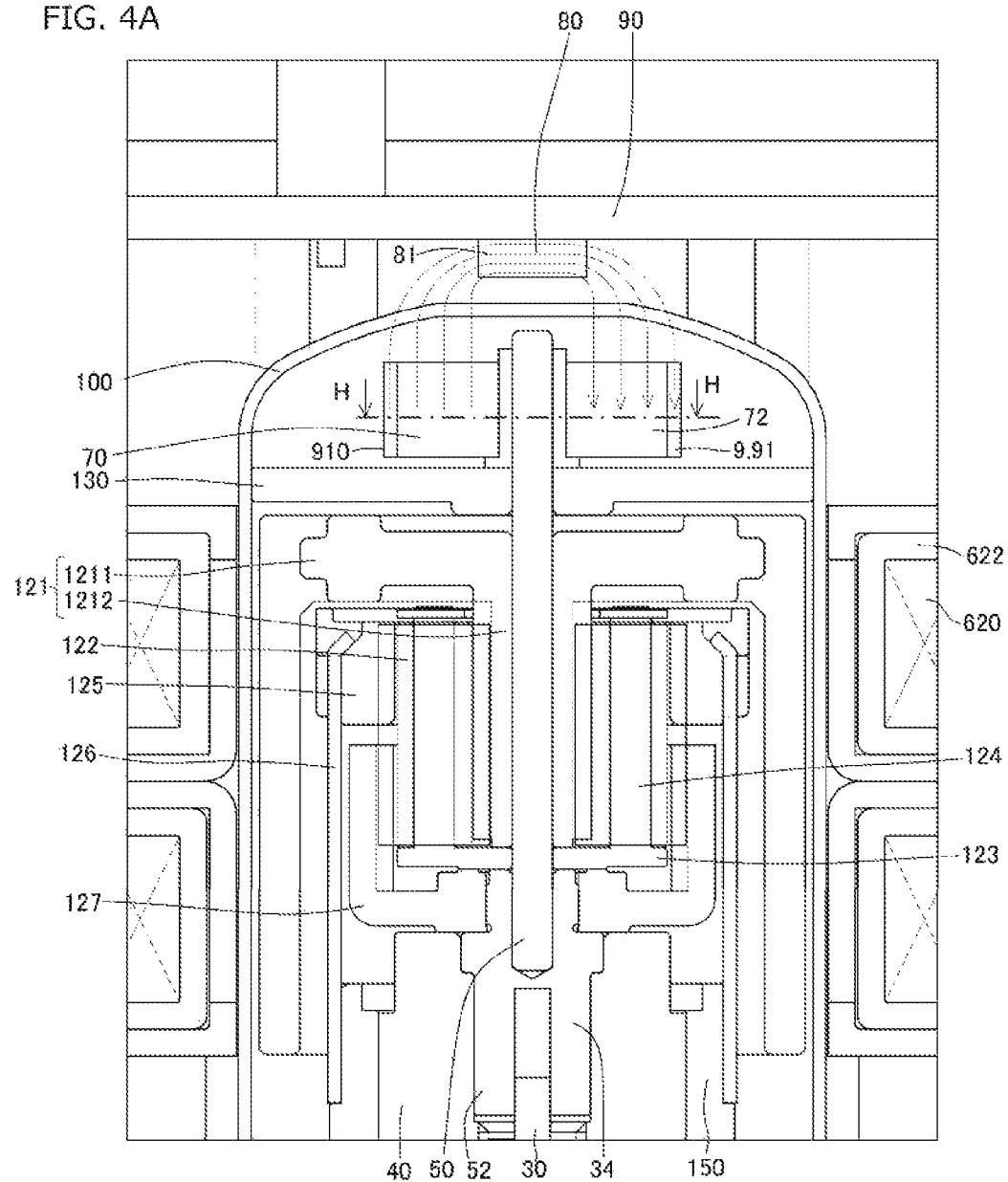

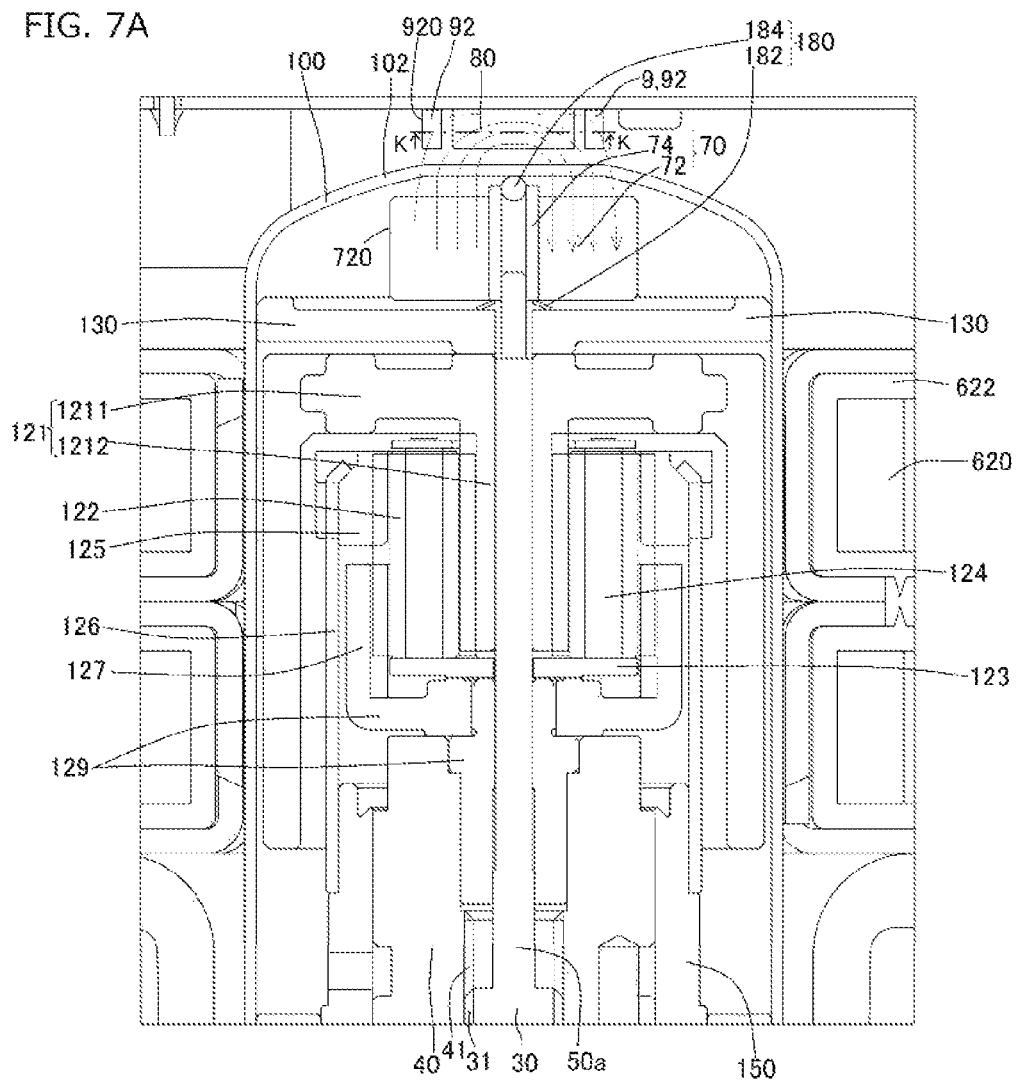

FIG. 9
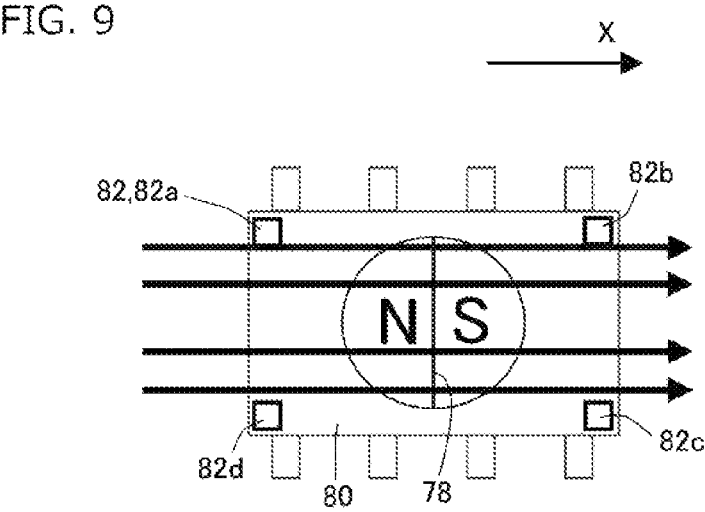
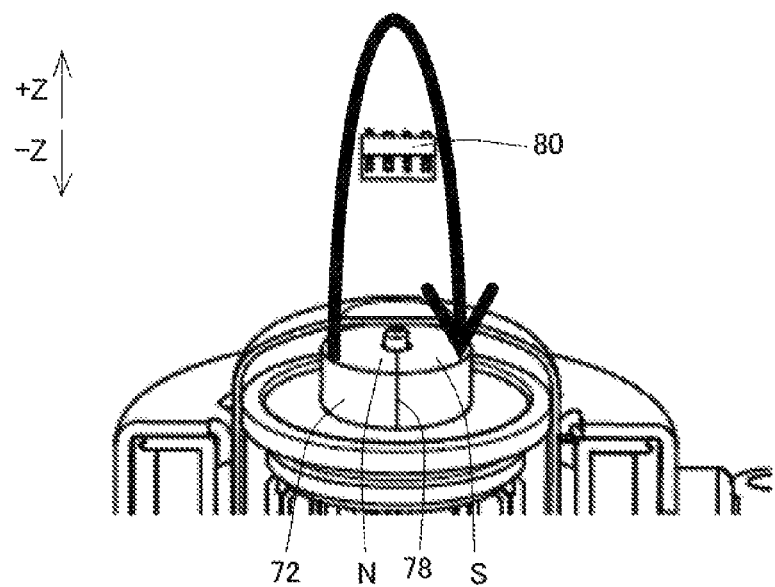

FIG. 10
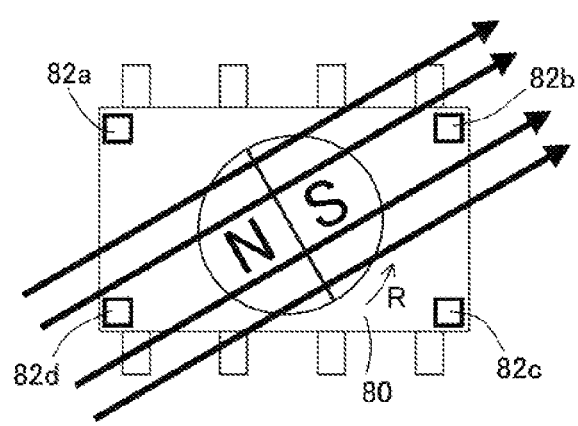
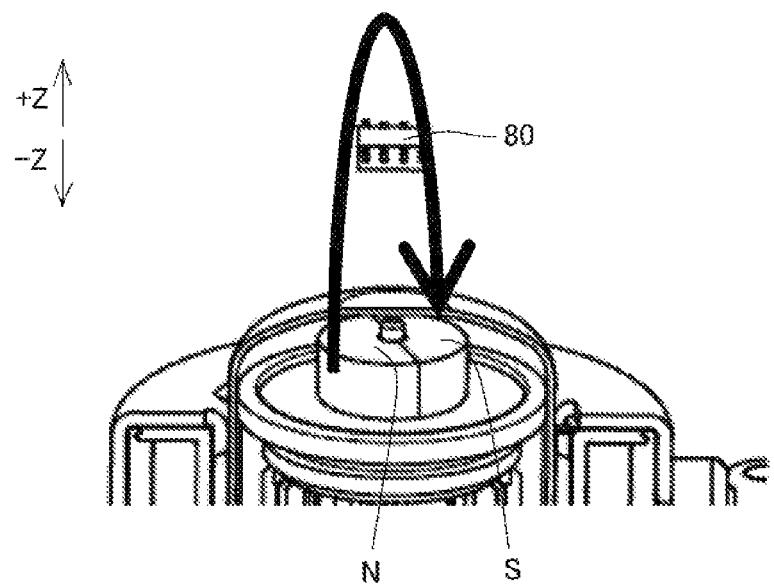

ELECTRICALLY OPERATED VALVE

CROSS REFERENCE TO RELATED APPLICATION

This Application is a 371 of PCT/JP2018/006233 filed on Feb. 21, 2018 which, in turn, claimed the priority of Japanese Patent Application No. 2017-070366 filed on Mar. 31, 2017, both applications are incorporated herein by reference.

TECHNICAL FIELD

The present invention relates to an electrically operated valve, and more particularly, to an electrically operated valve capable of detecting the position of a valve body.

BACKGROUND OF THE INVENTION

The use of angle sensors to detect the valve opening degree of electrically operated valves is known.

As an example of a related technique, Patent Document 1 discloses a valve opening degree detection device for an electrically operated valve. The valve opening degree detection device described in Patent Document 1 includes a magnetic drum in which north and south poles fixed to a rotation axis are equally divided on the circumference, a rotation angle detection magnetic sensor provided on the circumference of the outer side of a can opposite to the north and the south poles, a magnet provided on the end of the rotation axis, a vertical position detection magnetic sensor provided on the outer side of the can opposite to the magnet, and a valve opening degree calculation means for calculating a valve opening degree based on the detected values of the rotation angle detection magnetic sensor and the vertical position detection magnetic sensor.

Also, Patent Document 2 discloses an electrically operated valve using a stepping motor. The electrically operated valve disclosed in Patent Document 2 includes a stator, a rotor rotationally driven by the stator, a detection rotor for detecting a rotational position of the rotor, and a Hall IC disposed outside the detection rotor. In the electrically operated valve described in Patent Document 2, the rotational position of the rotor is detected based on an output signal detected by a Hall IC disposed on an outer side of the detection rotor.

CITATION LIST

Patent Literature

[Patent Document 1] Japanese Patent Application Publication No. 2001-12633
[Patent Document 2] Japanese Patent Application Publication No. 2014-161152

SUMMARY OF INVENTION

Technical Problem

In the electrically operated valve described in Patent Documents 1 and 2, the rotation angle of a rotating body such as a rotor is detected by a magnetic sensor disposed in the radially outer direction of the rotating body. However, when the rotation angle of the rotating body is detected by a magnetic sensor disposed in the radially outer direction of the rotating body, it is difficult to accurately detect the rotation angle of the rotating body unless a large number of magnetic sensors are disposed in the radially outer direction of the rotating body. Disposing a large number of magnetic sensors, however, increases the cost. In addition, it becomes necessary to secure sufficient space for disposing a large number of magnetic sensors, and there is a risk that the support mechanism for supporting the large number of magnetic sensors may become complicated. In addition, when the magnetic sensor detects the rotation angle by increasing or decreasing the Hall current, the rotation angle information is lost when the power is turned off, and when the power is turned on again, the absolute rotation angle of the rotating body may not be known.

It is therefore an object of the present invention to provide an electrically operated valve capable of more accurately detecting the position of the valve body by more accurately detecting the rotation angle of a rotation shaft.

Solution to Problem

In order to achieve the above object, the electrically operated valve according to the present invention includes a valve body, a driver configured to move the valve body along a first axis, a rotation shaft configured to rotate the driver around the first axis, a permanent magnet member disposed on a rotation shaft and configured to rotate with the rotation shaft, an angle sensor disposed above a permanent magnet included in the permanent magnet member and configured to detect a rotation angle of a permanent magnet, and a yoke configured to cover a portion of the permanent magnet or a portion of the angle sensor.

In the electrically operated valve according to some embodiments, the yoke may include a first yoke configured to cover a portion of the permanent magnet, and the first yoke may be configured to cover a side surface of the permanent magnet.

In the electrically operated valve according to some embodiments, a boundary region between a north pole and a south pole of the side surface of the permanent magnet may be exposed without being covered by the first yoke.

In the electrically operated valve according to some embodiments, the permanent magnet member may be an insert molded body that includes the permanent magnet and the first yoke.

In the electrically operated valve according to some embodiments, the yoke may include a second yoke configured to cover a portion of the angle sensor; and the second yoke may be configured to cover a side surface of the angle sensor or an upper surface of the angle sensor.

In the electrically operated valve according to some embodiments, an outer edge of the second yoke may be located further inward than an outer edge of the permanent magnet in a plan view.

In the electrically operated valve according to some embodiments, a lower surface of the angle sensor may be exposed without being covered by the second yoke.

In some embodiments, the electrically operated valve may further comprise a stator member that includes a coil, a rotor member coupled to the rotation shaft so as to enable power transmission, and a lower base member having a valve seat.

In some embodiments, the electrically operated valve may further comprise a control substrate configured to control a rotational movement of the rotation shaft.

Advantageous Effects of Invention

According to the present invention, it is possible to provide an electrically operated valve capable of more accurately detecting the position of a valve body.

BRIEF DESCRIPTION OF DRAWINGS

FIG. 3 is a schematic enlarged cross-sectional view of a portion of the electrically operated valve according to the second embodiment.

FIG. 4A is a further enlarged view of a portion of FIG. 3.

FIG. 7A is a further enlarged view of a portion of FIG. 5.

FIG. 9 is a diagram schematically illustrating the placement relationship between the permanent magnet and the angle sensor.

FIG. 10 is a diagram schematically illustrating the placement relationship between the permanent magnet and the angle sensor.

DESCRIPTION OF EMBODIMENT(S)

Figure 1:
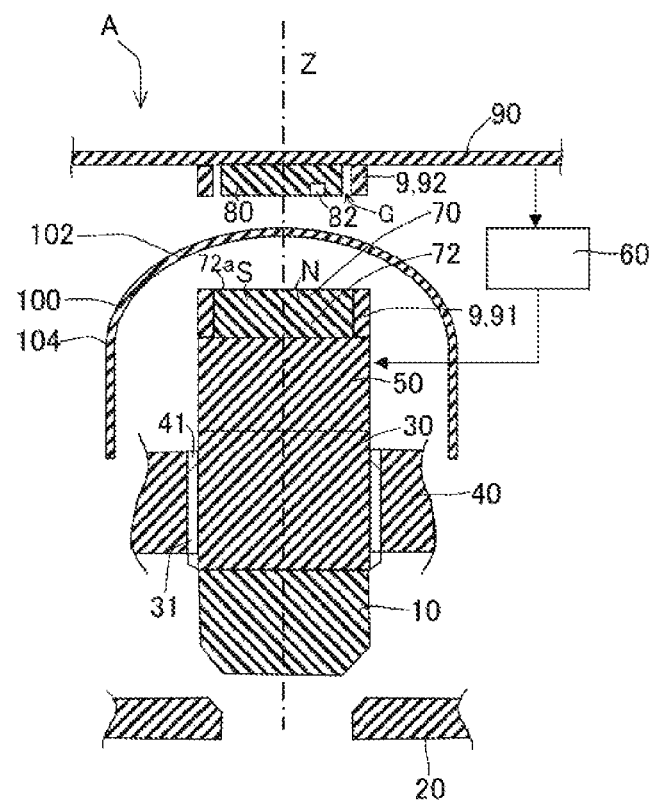
FIG. 1 is a schematic cross-sectional view illustrating an overview of an electrically operated valve according to the first embodiment.

Hereinafter, an electrically operated valve according to embodiments will be described with reference to the drawings. It should be noted that in the following description of the embodiments, parts and members having the same functions are denoted by the same reference numerals, and repetitive descriptions of parts and members denoted by the same reference numerals are omitted.

First Embodiment

Referring to FIG. 1, a description will be provided of an electrically operated valve A according to the first embodiment. FIG. 1 is a schematic cross-sectional view illustrating an overview of an electrically operated valve A according to the first embodiment. It should be noted that, in FIG. 1, in order to avoid complication of the drawing, a portion of the electrically operated valve A is omitted.

The electrically operated valve A includes a valve body 10, a driver 30, a rotation shaft 50, a power source 60 for transmitting power to the rotation shaft 50, a permanent magnet member 70 that includes a permanent magnet 72, an angle sensor 80 for detecting a rotation angle of the permanent magnet 72, and a yoke 9 configured to cover a portion of the permanent magnet member 70 or a portion of the angle sensor 80. It should be noted that although FIG. 1 illustrates an example in which the electrically operated valve A includes a first yoke 91 that covers a portion of the permanent magnet 72 and a second yoke 92 that covers a portion of the angle sensor 80, the electrically operated valve A may include only one of the first yoke 91 that covers a portion of the permanent magnet 72 or the second yoke 92 that covers a portion of the angle sensor 80.

The valve body 10 closes the flow path by contacting the valve seat 20, and opens the flow path by separating from the valve seat 20.

The driver 30 is a member for moving the valve body 10 along the first axis Z. In the example illustrated in FIG. 1, a male thread 31 is provided on the outer peripheral surface of the driver 30. The male thread 31 is screwed to a female thread 41 provided on a guide member 40 for guiding the driver. As the driver 30 rotates relative to the guide member 40, the driver 30 moves along the first axis Z. The driver 30 and the valve body 10 are mechanically connected to each other. Accordingly, when the driver 30 moves along the first axis Z, the valve body 10 also moves along the first axis Z. It should be noted that the driver 30 and the valve body 10 may be integrally formed or may be separately formed.

The rotation shaft 50 is a member for rotating the driver 30 about the first axis Z. The rotation shaft 50 receives power from a power source 60 and rotates about the first axis Z. The rotation shaft 50 and the driver 30 are mechanically connected to each other. Accordingly, when the rotation shaft 50 rotates about the first axis Z, the driver 30 also rotates about the first axis Z. The rotation shaft 50 and the driver 30 may be integrally formed or may be separately formed.

In the example illustrated in FIG. 1, the valve body 10, the driver 30, and the rotation shaft 50 are arranged on a straight line (i.e., on the first axis Z). Accordingly, the motion conversion mechanism for converting the rotational motion of the rotation shaft 50 into the axial motion of the valve body 10 is simplified. It should be noted that the embodiments are not limited to an arrangement in which the valve body 10, the driver 30, and the rotation shaft 50 form a straight line.

The permanent magnet member 70 rotates about the first axis Z together with the rotation shaft 50. The permanent magnet member 70 includes a permanent magnet 72, and the permanent magnet 72 includes a north pole and a south pole in a cross section perpendicular to the first axis Z. The permanent magnet member 70 may be fixed to the rotation shaft 50. Alternatively, as illustrated in the third embodiment to be described later, the permanent magnet member 70 may be non-rotatable relative to the rotation shaft 50 and may be movable relative to the rotation shaft 50 along the first axis Z direction.

The angle sensor 80 detects the rotation angle of the permanent magnet 72 included in the permanent magnet member 70. The angle sensor 80 is disposed above the permanent magnet 72. Since the angle sensor 80 is a sensor for detecting the rotation angle of the permanent magnet 72, it is arranged separately from the rotating body that includes the permanent magnet 72. The angle sensor 80 includes a magnetic detection element 82 for detecting a magnetic flux density or the like. As the permanent magnet 72 rotates about the first axis Z, the magnetic flux passing through the magnetic detection element 82 changes. In this way, the magnetic detection element 82 (the angle sensor 80) detects the rotation angle of the permanent magnet 72 about the first axis Z.

As the permanent magnet 72 rotates about the first axis Z, the angle of the magnetic flux passing through the magnetic detection element 82 located above the permanent magnet continuously changes. As a result, the magnetic detection element 82 (angle sensor 80) can continuously detect the rotation angle of the permanent magnet 72 about the first axis Z. In the example illustrated in FIG. 1, the change in the rotation angle of the permanent magnet 72 about the first axis Z is proportional to the change in the position of the valve body 10 in a direction along the first axis Z. Therefore, the angle sensor 80 detects the rotation angle of the permanent magnet 72 about the first axis Z, whereby the position of the valve body 10 in the direction along the first axis Z, that is, the opening degree of the valve can be calculated. The electrically operated valve A may include a computing device that converts the angle data output from the angle sensor 80 into position data of the valve body 10 in a direction along the first axis Z, that is, opening degree data for the valve. The computing device may be disposed on a control substrate 90.

In the present specification, the end of the rotation shaft 50 on a side of the valve body 10 is referred to as a second end, and the end of the rotation shaft 50 on the opposite side to the valve body is referred to as a first end. Also, in the present specification, "upward" is defined as the direction extending from the second end toward the first end. Accordingly, in reality, even in a case in which the second end portion were to be further upward from the first end portion, the direction extending from the second end portion toward the first end portion is referred to as "upward" in this specification. It should be noted that, in the present specification, the direction opposite to the upward direction, that is, the direction extending from the first end to the second end is referred to as "downward." Further, the angle sensor 80 is not limited to an arrangement in which the center coincides with the rotation axis of the rotation shaft 50, and the mounting position may be changed in accordance with the measurement sensitivity.

In the first embodiment, the electrically operated valve A includes a yoke 9 configured to cover a portion of the permanent magnet 72 or a portion of the angle sensor 80.

In the example illustrated in FIG. 1, the first yoke 91 covers a side surface of the permanent magnet 72. Since the first yoke 91 covers a side surface of the permanent magnet 72, the first yoke 91 collects the magnetic flux from the permanent magnet 72 and increases the density of the magnetic flux toward the angle sensor 80. As a result, the detection accuracy of the rotation angle of the permanent magnet 72 by the angle sensor 80 is improved.

In the example illustrated in FIG. 1, the upper surface 72a of the permanent magnet 72 is not covered with the first yoke 91 (the upper surface 72a is exposed). In addition, the lower surface of the permanent magnet 72 is not covered by the first yoke 91, but the lower surface of the permanent magnet 72 may be covered by the first yoke 91. It should be noted that, as the material of the first yoke 91, a known soft magnetic material such as pure iron can be used.

In the example illustrated in FIG. 1, the second yoke 92 covers the side surface of the angle sensor 80. It should be noted that the second yoke 92 may be in contact with the side surface of the angle sensor 80, or may be separated from the side surface of the angle sensor 80. In the example illustrated in FIG. 1, there is a gap G between the second yoke 92 and the side surface of the angle sensor 80.

The second yoke 92 collects the magnetic flux from the permanent magnet 72 and collects the magnetic flux generated by magnetic field generating members other than the permanent magnet 72. For example, when the power source 60 includes a coil, a magnetic field is generated by the current flowing through the coil. The second yoke 92 collects the magnetic flux generated by the coil or the like. When the second yoke 92 is not present, the angle sensor 80 also detects the magnetic flux generated by the coil or the like. Accordingly, the signal output from the angle sensor 80 includes noise that is not directly related to the rotation of the permanent magnet 72 (i.e., noise caused by the magnetic flux generated by the coil or the like). In contrast, when a second yoke 92 covering a portion of the angle sensor 80 is provided, the magnetic flux generated by the coil or the like is collected by the second yoke 92. In this way, the angle sensor 80 is effectively shielded from the magnetic flux generated by the coil or the like. Accordingly, noise included in the signal output from the angle sensor 80 is reduced. As a result, the detection accuracy of the rotation angle of the permanent magnet 72 by the angle sensor 80 is improved.

In the example illustrated in FIG. 1, the second yoke 92 covers a side surface of the angle sensor 80. Alternatively or additionally, the second yoke 92 may cover the upper surface of the angle sensor 80. That is, the second yoke 92 may be disposed between the angle sensor 80 and the control substrate 90. As the material of the second yoke 92, a known soft magnetic material such as pure iron can be used.

Optional Additional Configuration Example 1

Next, an optional additional configuration example that can be employed in the first embodiment will be described. In Configuration Example 1, the valve body 10, the rotation shaft 50, the permanent magnet 72, and the angle sensor 80 are arranged in a straight line. By arranging the valve body 10, the rotation shaft 50, the permanent magnet 72, and the angle sensor 80 in a straight line, it is possible to make the entire electrically operated valve A, including the drive mechanism of the valve body and the rotation angle detection mechanism of the permanent magnet (put differently, the position detection mechanism of the valve body), compact.

Optional Additional Configuration Example 2

In Configuration Example 2, the angle sensor 80 is supported by a control substrate 90 that controls the rotational operation of the rotation shaft 50. Accordingly, it is unnecessary to separately prepare a support member for supporting the angle sensor 80. As a result, the structure of the electrically operated valve A can be simplified, and the size of the electrically operated valve A can be reduced. It should be noted that the control substrate 90 transmits a control signal to the power source 60 to control the operation of the power source.

Optional Additional Configuration Example 3

In Configuration Example 3, the electrically operated valve A includes a case (for example, a metal can 100) for accommodating the permanent magnet 72. The end wall 102 of the case is disposed between the angle sensor 80 and the permanent magnet member 70. In other words, the angle sensor 80 and the permanent magnet member 70 are disposed to face each other with the end wall 102 of the case interposed therebetween. It should be noted that the case is not a rotating body that rotates about the first axis Z. Accordingly, when the electrically operated valve A operates, the permanent magnet 72 rotates relative to the case, which is in a stationary state. When a rotating body such as the permanent magnet 72 rotates within the case, there is a possibility that the vibration of the rotating body is transmitted to the case. In the example illustrated in FIG. 1, since the angle sensor 80 is disposed apart from the case, the vibration of the rotating body is suppressed from being transmitted to the angle sensor 80. Therefore, the angle detection accuracy of the permanent magnet by the angle sensor 80 is improved.

In the example illustrated in FIG. 1, the end wall 102 of the case covers the upper surface of the permanent magnet member 70. In the example illustrated in FIG. 1, the end wall 102 has an upwardly convex dome shape. Also, a cylindrical side wall 104 extends downward from the end wall 102 of the case.

It should be noted that in the first embodiment, it is possible for Configuration Examples 1 to 3 to be employed in combination. For example, in the first embodiment, Configuration Example 1 and Configuration Example 2, Configuration Example 2 and Configuration Example 3, or Configuration Examples 1 to 3 may be employed. In addition, Configuration Examples 1 to 3 may be employed in the embodiments to be described later (the second embodiment and the third embodiment).

Second Embodiment

Figure 2:
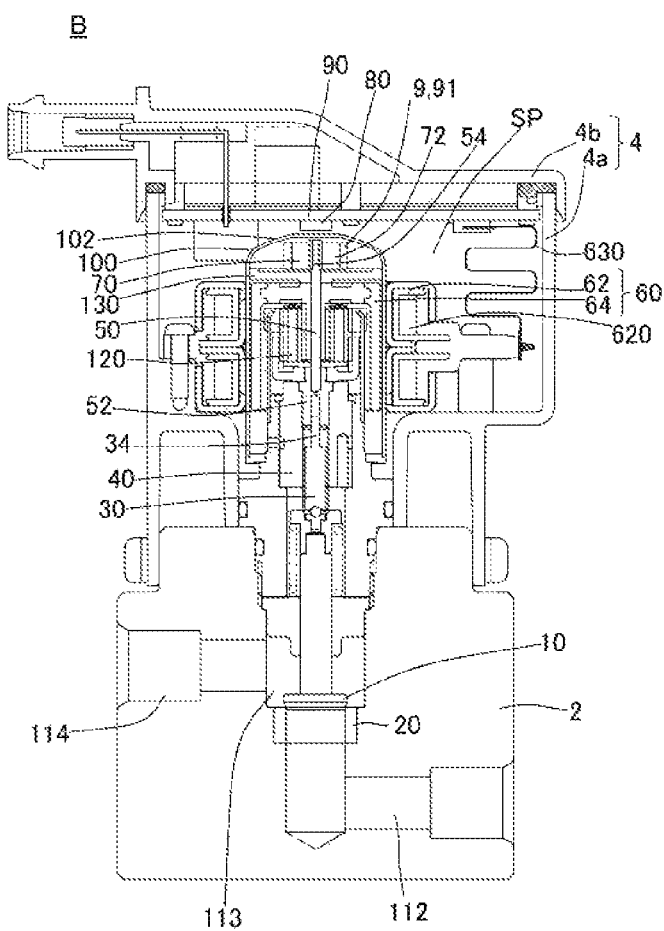
FIG. 2 is a schematic cross-sectional view of an electrically operated valve according to the second embodiment.
Figure 4B:
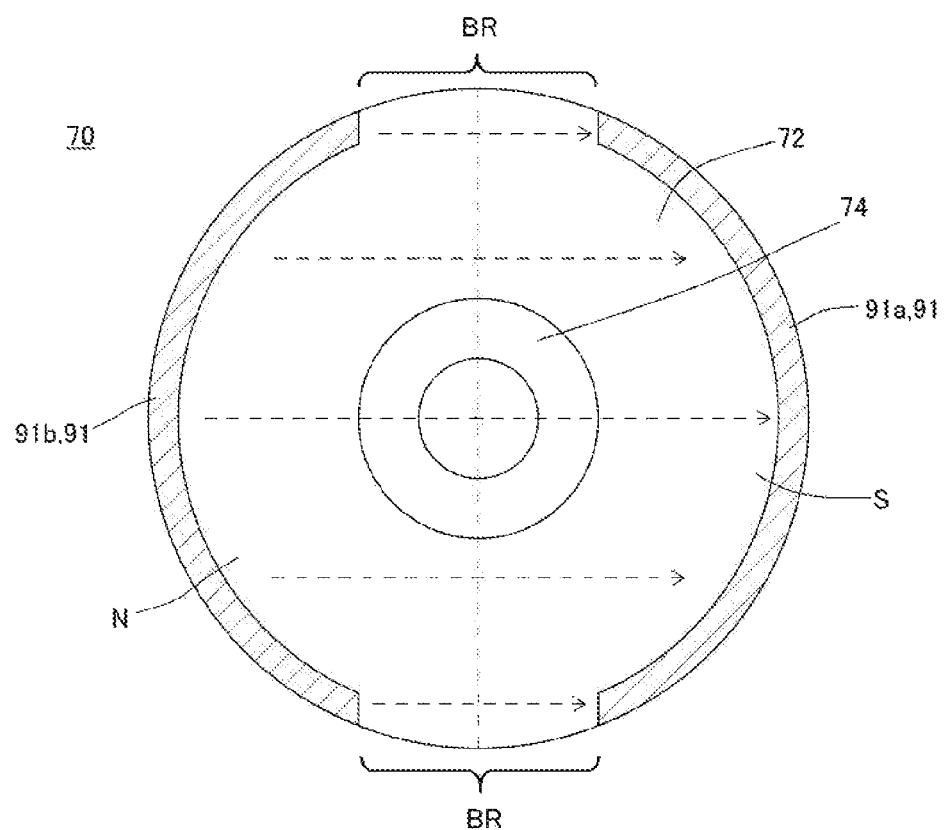
FIG. 4B is a cross-sectional view taken along the line H-H in FIG. 4A.

Referring to FIG. 2 to FIG. 4B, a description will be provided of an electrically operated valve B according to the second embodiment. FIG. 2 is a schematic cross-sectional view of the electrically operated valve B according to the second embodiment. FIG. 3 is a schematic enlarged cross-sectional view of a portion of the electrically operated valve B according to the second embodiment. FIG. 4A is a further enlarged view of a portion of FIG. 3. FIG. 4B is a cross-sectional view taken along the line H-H in FIG. 4A.

The electrically operated valve B includes a valve body 10, a valve seat 20, a driver 30, a rotation shaft 50, a power source 60 for transmitting power to the rotation shaft 50, a permanent magnet member 70 that includes a permanent magnet 72, an angle sensor 80 for detecting a rotation angle of the permanent magnet 72, and a yoke 9 (the first yoke 91) configured to cover a portion of the permanent magnet member 70.

The electrically operated valve B includes a first flow path 112 and a second flow path 114. When the valve body 10 and the valve seat 20 are separated from each other, that is, when the valve body 10 is in the upward position, the fluid flows into the valve chamber 113 via the first flow path 112, and the fluid in the valve chamber 113 is discharged via the second flow path 114. In contrast, when the valve body 10 and the valve seat 20 are in contact with each other, that is, when the valve body 10 is in the downward position, the first flow path 112 and the second flow path 114 are in a state of non-communication with each other.

It should be noted that in the example illustrated in FIG. 2, the first flow path 112, the valve seat 20, and the second flow path 114 are provided in a lower base member 2.

In the example illustrated in FIG. 2, the electrically operated valve B includes a power source 60 and a power transmission mechanism 120.

The power source 60 includes a stator member 62 that includes a coil 620 and a rotor member 64. A pulse signal is input to the coil 620 from an electric wire 630 connected to the power source. Then, when a pulse signal is input to the coil 620, the rotor member 64 rotates by a rotation angle corresponding to the number of pulses of the pulse signal. That is, in the example illustrated in FIG. 2, the stator member 62 and the rotor member 64 constitute a stepping motor. It should be noted that the rotor member 64 also includes a magnet, but this magnet is different from the permanent magnet 72 whose rotation angle is detected by the angle sensor 80.

The power transmission mechanism 120 is a member for connecting the rotor member 64 and the rotating shaft 50 so as to be able to transmit power. The power transmission mechanism 120 includes a plurality of gears. The power transmission mechanism 120 may include a planetary gear mechanism. Details of the planetary gear mechanism will be described later.

In the example illustrated in FIG. 2, the electrically operated valve B includes a housing member 4. An accommodation space SP (for example, a liquid-tight closed space) is formed in the housing member 4, and the above-described stator member 62, the can 100, the control substrate 90, and the like are accommodated in the accommodation space SP.

In the example illustrated in FIG. 2, the control substrate 90 is supported by the housing member 4. More specifically, the housing member 4 includes a cylindrical member 4*a* constituting a side wall and a cover member 4*b*, and the control substrate 90 is supported by the cover member 4*b*.

The control substrate 90 (more specifically, a circuit on the control substrate) controls the number of pulses supplied to the coil 620. When a predetermined number of pulses is supplied to the coil 620, the rotor member 64 rotates by a rotation angle corresponding to the number of pulses. The rotor member 64 and the rotation shaft 50 are connected via a power transmission mechanism 120 so as to enable power transmission. Accordingly, when the rotor member 64 rotates, the rotation shaft 50 rotates by a rotation angle proportional to the rotation angle of the rotor member 64.

The rotation shaft 50 rotates the driver 30. In the example illustrated in FIG. 2, the second end 52 (that is, a shaft-side engagement member) of the rotation shaft 50 and the upper end 34 (that is, the driver-side engagement member) of the driver 30 are mechanically connected to each other so as not to be capable of rotation relative to each other. In addition, the second end 52 of the rotation shaft 50 and the upper end 34 of the driver 30 are movable relative to each other along the first axis Z. Accordingly, the rotation shaft 50 can move the driver 30 up and down without changing the vertical position of the rotation shaft 50 itself.

The permanent magnet member 70 is disposed at the first end 54 of the rotation shaft 50. In the example illustrated in FIG. 2, the position of the rotation shaft 50 in the vertical direction is not changed by the rotation operation of the rotation shaft 50. Accordingly, the position of the permanent magnet member 70 in the vertical direction, as well, is also not changed by the rotation operation of the rotation shaft 50. As a result, the distance between the permanent magnet member 70 and the angle sensor 80 is kept constant during the operation of the electrically operated valve B.

That is, in the second embodiment, since the rotation shaft 50 and the driver 30 are separate bodies, and the rotation shaft 50 and the driver 30 are movable relative to each other along the first axis Z, it is possible to maintain a constant distance between the permanent magnet member 70 disposed on the rotation shaft 50 and the angle sensor 80. As a result, the accuracy of the detection of the rotation angle of the permanent magnet 72 by the angle sensor 80 is improved. In cases where the rotation shaft 50 and the permanent magnet 72 move up and down along with the vertical movement of the driver 30, there is a risk that the detection accuracy of the rotation angle of the permanent magnet 72 by the angle sensor 80 may be lowered. In contrast, the second embodiment is innovative in that the rotation shaft 50 and the permanent magnet 72 are prevented from moving up and down even when the driver 30 moves vertically.

In the example illustrated in FIG. 2, it can also be said that the rotation shaft 50 itself functions as a permanent magnet positioning member that maintains a constant distance between the permanent magnet 72 and the angle sensor 80. In the second embodiment, any connection between the rotation shaft 50 and the permanent magnet member 70 can be employed as long as the rotation shaft 50 and the permanent magnet member 70 are directly or indirectly connected so that they cannot move relative to each other. However, from the viewpoint of further ensuring the prevention of relative movement, it is preferable that the rotation shaft 50 and the permanent magnet member 70 be directly fixed to each other.

Referring to FIG. 4A and FIG. 4B, the first yoke 91 included in the permanent magnetic member 70 will be described in more detail. The first yoke 91 covers a portion of the side surface of the permanent magnet 72. Since the first yoke 91 covers a portion of the side surface of the permanent magnet 72, the first yoke 91 collects the magnetic flux from the permanent magnet 72, and increases the density of the magnetic flux toward the angle sensor 80. As a result, the detection accuracy of the rotation angle of the permanent magnet 72 by the angle sensor 80 is improved.

In the example illustrated in FIG. 4A, the outer edge 910 of the first yoke 91 surrounds the outer edge 81 of the angle sensor 80 in a plan view (or, alternatively, in a bottom view). In other words, the angle sensor 80 is disposed inside the first yoke 91 in a plan view (or a bottom view). Accordingly, the magnetic flux from the first yoke 91 is effectively guided toward the angle sensor 80.

Referring to FIG. 4B, the first yoke 91 includes a south-pole side yoke 91a and a north-pole side yoke 91b. The south-pole side yoke 91a covers a portion of the side surface of the south pole of the permanent magnet 72, and the north-pole side yoke 91b covers a portion of the side surface of the north pole side of the permanent magnet 72. In addition, the south-pole side yoke 91a is fixed to the side surface of the permanent magnet 72, and the north-pole side yoke 91b is fixed to the side surface of the permanent magnet 72.

A permanent magnet member 70 including the first yoke 91 and the permanent magnet 72 may be formed by insert molding. For example, after the first yoke 91 is disposed in the mold, resin material containing magnetic powder is poured into the mold. By solidifying this resin material, the permanent magnet member 70 is insert-molded. The insert-molded permanent magnet member 70 includes a plastic magnet and a first yoke 91 disposed around the plastic magnet.

A permanent magnet member 70 including the first yoke 91, the permanent magnet 72, and the collar member 74 may be formed by insert molding. For example, after the first yoke 91 and the collar member 74 are disposed in the mold, resin material containing magnetic powder is poured into the mold. By solidifying this resin material, the permanent magnet member 70 is insert-molded. The insert-molded permanent magnet member 70 includes a ring-shaped plastic magnet, a first yoke 91 disposed on the outer circumferential side thereof, and a collar member 74 disposed on the inner circumferential side of the ring-shaped plastic magnet.

When a permanent magnet member 70 including the first yoke 91 and the permanent magnet 72 is formed by insert molding (in other words, in cases where the permanent magnet member 70 is an insert molded body that includes the first yoke 91 and the permanent magnet 72), it is not necessary to fix the first yoke 91 and the permanent magnet 72 after manufacturing of the permanent magnet 72. Accordingly, high dimensional accuracy is not required for the first yoke 91 and the permanent magnet 72. As a result, the manufacturing cost of the permanent magnet member 70 is reduced.

In the example illustrated in FIG. 4B, the first yoke 91 is divided into a south-pole side yoke 91a and a north-pole side yoke 91b. Accordingly, even in cases where the permanent magnet member 70 is not formed by insert molding, the permanent magnet member 70 can be manufactured by attaching the two arc-shaped yokes (91a, 91b) to the permanent magnet 72 so as to sandwich them from the left and right. In this way, the permanent magnet member 70 can be easily manufactured.

Further, in the example illustrated in FIG. 4B, the two bounding regions BR between the north pole and the south pole of the side surfaces of the permanent magnets 72 are exposed without being covered by the first yokes 91. Accordingly, a strong magnetic circuit is formed in the boundary region BR between the north pole and the south pole, and the magnetic flux toward the angle sensor 80 does not decrease.

In the example illustrated in FIG. 4B, the permanent magnetic member 70 includes a south-pole side yoke 91a and a north-pole side yoke 91b separated from each other. For this reason, a strong parallel magnetic field (refer to the broken line arrows in FIG. 4B) is formed between the north-pole side yoke 91b and the south-pole side yoke 91a. Accordingly, the detection accuracy of the rotation angle of the permanent magnet 72 by the angle sensor 80 is further improved. It should be noted that the south-pole side yoke 91a and the north-pole side yoke 91b may be divided on the side surface of the permanent magnet 72. In this way, the south-pole side yoke 91a and the north-pole side yoke 91b may be connected to each other on the lower surface of the permanent magnet 72 (that is, the first yoke 91 may have a bottom portion).

In the example illustrated in FIG. 4B, approximately ¾ of the side surface of the permanent magnet 72 is covered by the first yoke 91, and approximately ¼ of the side surface of the permanent magnet member is exposed without being covered by the first yoke 91 (in other words, the outer periphery corresponding to roughly 270 degrees of the outer peripheral surface of the permanent magnet 72 is covered by the first yoke). From the perspective of maintaining balance when the permanent magnet member 70 rotates, it is preferable that ½ or more of the side surface of the permanent magnet 72 be covered by the first yoke 91 (in other words, less than ½ of the side surface of the permanent magnet 72 may be exposed). In addition, from the perspective of maintaining balance when the permanent magnet member 70 rotates, it is more preferable that ⅔ or more of the side surface of the permanent magnet 72 be covered by the first yoke 91 (in other words, less than ⅓ of the side surface of the permanent magnet 72 may be exposed).

It should be noted that the configuration of the permanent magnet member 70 in the second embodiment may be utilized as the configuration of the permanent magnet member in the first embodiment, or may be utilized as the configuration of the permanent magnet member in the third embodiment.

In the example illustrated in FIG. 2, a partition member 130 for partitioning the inside of the can into an upper space and a lower space is disposed inside the can 100. The permanent magnet member 70 is disposed in an upper space formed by the partition member 130; that is, a space between the partition member 130 and the end wall 102 (upper wall) of the can 100. Accordingly, even if chipping or the like occurs in the permanent magnet member 70, there is no risk that magnetic particles or the like may enter the lower space. It should be noted that the partition member 130 may be a bearing member that rotatably supports the rotation shaft 50 with respect to the can 100. In cases where the partition member 130 is a bearing member, the partition member 130 has both a function as a partition for separating the upper space in which the permanent magnet member 70 is disposed from the lower space in which the rotor member 64 and the like are disposed, as well as a function as a bearing. The partition member 130 has a disk shape, for example.

The material of the partition member 130 will be described. The partition member 130 of the present embodiment is made of, for example, a resin (e.g., polyphenylene sulfide (PPS)). Alternatively, the partition member 130 may be formed of a soft magnetic material. Examples of the soft magnetic material include iron, silicon steel, a resin having magnetism, and the like. The member for partitioning the inside of the can into the upper space and the lower space is made of a soft magnetic material, whereby interference between the magnetism of the permanent magnet member 70 and other magnetism, for example, the magnetism of the rotor member 64, can be prevented. In particular, the permanent magnet member 70 is magnetized at two poles in the circumferential direction, and the rotor member 64 is magnetized in such a manner that magnetic poles of four or more poles (for example, eight poles) alternate in the circumferential direction. Therefore, by preventing the interference between the magnetism of the permanent magnet member 70 and the magnetism of the rotor member 64, the deviation of the angle measured by the angle sensor 80 and the slight torque variation of the rotation of the rotor member 64 can be prevented. It is needless to say that the partition member 130 of the third embodiment described later may also be formed of a soft magnetic material.

(Power Transmission Mechanism)

An example of a mechanism for transmitting power from the power source 60 to the valve body 10 will be described in detail with reference to FIG. 3. FIG. 3 is a schematic enlarged cross-sectional view of a portion of the electrically operated valve B of the second embodiment.

In the example illustrated in FIG. 3, the stator member 62 that forms a portion of the power source 60 is fixed to the side wall 104 of the can 100. The stator member 62 includes a bobbin 622 and a coil 620 wound around the bobbin.

In the example illustrated in FIG. 3, the rotor member 64 that constitutes a portion of the power source 60 is disposed inside the side wall 104 of the can 100 so as to be freely rotatable with respect to the can 100. The rotor member 64 is formed of a magnetic material. The rotor member 64 is (fixedly) connected to a power transmission mechanism 120, such as the sun gear member 121, for example.

The sun gear member 121 includes a coupling portion 1211 coupled to the rotor member 64 and a sun gear 1212. The coupling portion 1211 extends along a radial direction (that is, a direction perpendicular to the first axis Z), and the sun gear 1212 extends along the first axis Z. In the axial hole of the sun gear 1212, the rotation shaft 50 is disposed so as to be freely rotatable relative to the inner wall of the sun gear.

The external teeth of the sun gear 1212 mesh with the plurality of planetary gears 122. Each planetary gear 122 is rotatably supported by a shaft 124 that is supported by a carrier 123. The outer teeth of each planetary gear 122 mesh with an annular ring gear 125 (internal tooth-fixed gear).

The ring gear 125 is a member that cannot rotate relative to the can 100. In the example illustrated in FIG. 3, the ring gear 125 is supported by a holder 150 (to be described later) via a cylindrical support member 126.

In addition, the planetary gear 122 also meshes with an annular second ring gear 127 (an internal tooth-movable gear). In the example illustrated in FIG. 3, the second ring gear 127 functions as an output gear fixed to the rotation shaft 50. Alternatively, an output gear different from the second ring gear 127 may be fixed to the rotation shaft 50, and power from the second ring gear 127 may be transmitted to the rotation shaft 50 via the output gear. It should be noted that fixing of the rotation shaft 50 to the output gear may be performed by press-fitting the rotation shaft 50 to the output gear.

The above-described gear configuration (the sun gear, planetary gear, internal tooth-fixed gear, and internal tooth-movable gear) constitutes a so-called mechanical paradox planetary gear mechanism. In a reduction gear device using a mechanical paradox planetary gear mechanism, by setting the number of teeth of the second ring gear 127 to be slightly different from the number of teeth of the ring gear 125, the rotational speed of the sun gear 1212 can be reduced at a large reduction gear ratio and transmitted to the second ring gear 127.

It should be noted that in the example illustrated in FIG. 3, a mechanical paradox planetary gear mechanism is employed as the power transmission mechanism 120. However, in embodiments, any power transmission mechanism can be employed as the power transmission mechanism between the rotor member 64 and the rotation shaft 50. As the power transmission mechanism 120, a planetary gear mechanism other than the mechanical paradox planetary gear mechanism may be utilized.

As illustrated in FIG. 3, the rotation shaft 50 includes a first end 54 and a second end 52. In the example illustrated in FIG. 3, the rotation shaft 50 includes a rotation shaft body having a first end 54 and a shaft-side engagement member having a second end 52. The rotation shaft main body and the shaft-side engagement member are fixed to each other by, for example, welding or the like. The shaft-side engagement member engages with the driver-side engagement member formed by the upper end portion 34 of the driver 30 so as not to be rotatable relative to the driver-side engagement member while also being movable relative to the driver-side engagement member along the first axis Z direction.

A male thread 31 is provided on the outer peripheral surface of the driver 30. The male thread 31 is screwed to a female thread 41 provided on a guide member 40 for guiding the driver. Accordingly, when the rotation shaft 50 and the driver 30 rotate about the first axis Z, the driver 30 moves up and down while being guided by the guide member 40. In contrast, the rotation shaft 50 is rotatably supported by a shaft receiving member such as the sun gear 1212 or the guide member 40, and cannot move along the first axis Z direction.

It should be noted that in the example illustrated in FIG. 3, the guide member 40 for guiding the driver 30 is supported by a holder 150 to be described later.

The lower end 32 of the driver 30 is rotatably connected to the upper end 12 of the valve body 10 via a ball 160 or the like. In the example illustrated in FIG. 3, when the driver 30 moves downward while rotating about the first axis Z, the valve body 10 moves downward without rotating about the first axis Z. In addition, when the driver 30 moves upward while rotating about the first axis Z, the valve body 10 moves upward without rotating about the first axis Z.

The downward movement of the valve body 10 is performed as a result of the valve body 10 being pushed by the driver 30. The upward movement of the valve body 10 is performed by pushing the valve body 10 upward by a spring member 170 such as a coil spring while the driver 30 is moving upward. That is, in the example illustrated in FIG. 3, the valve body 10 is constantly urged upward by the spring member 170 disposed between the spring bearing member 172 and the valve body 10. Alternatively or additionally, the valve body 10 and the driver 30 may be connected by a rotary joint, such as a ball joint, so that they cannot move relative to each other in a direction along the first axis Z. In this case, the spring member 170 may be omitted.

With the above configuration, it is possible to drive the valve body 10 by using the power from the power source 60. The amount of movement of the valve body 10 in the direction along the first axis Z is proportional to the amount of rotation of the rotation shaft 50 and the permanent magnet 72. Accordingly, in the second embodiment, by measuring the rotation angle of the permanent magnet 72 about the first axis Z by the angle sensor 80, it is possible to accurately determine the position of the valve body 10 in the direction along the first axis Z. It should be noted that the electrically operated valve B may include a computing device that converts the angle data output from the angle sensor 80 into position data of the valve body 10 in the direction along the first axis Z; that is, the opening degree data for the valve.

In the second embodiment, the rotation shaft 50 and the permanent magnet 72 do not move up and down with respect to the angle sensor 80. In other words, the distance between the permanent magnet 72 and the angle sensor 80 is maintained at a constant distance during the operation of the electrically operated valve B. Accordingly, in the second embodiment, it is possible to accurately calculate the rotation angle of the permanent magnet 72 and the position of the valve body 10 along the first axis Z using the angle sensor 80.

It should be noted that, in the example illustrated in FIG. 3, the holder 150 is disposed in the concave portion of the lower base member 2. In addition, a first seal member 152 such as an O-ring is disposed between the holder 150 and the lower base member 2. Further, the holder 150 defines an internal space in which the upper end portion 12 of the valve body 10 can move. Accordingly, the holder 150 has a function of accommodating the upper end portion 12 of the valve body 10 in addition to a sealing function of preventing the liquid from entering into the space in which the stator member 62 and the like are disposed.

In addition, as described above, the holder 150 may have a function of supporting at least one of the cylindrical support member 126 or the guide member 40.

Further, in the example illustrated in FIG. 3, the holder 150 is disposed so as to be in contact with the side wall portion of the housing member 4. A second seal member 154 such as an O-ring is disposed between the holder 150 and the side wall of the housing member 4. Accordingly, the holder 150 can further prevent liquid from entering into the space in which the stator member 62 and the like are disposed.

It should be noted that each configuration of the electrically operated valve B in the second embodiment may be adopted in the electrically operated valve A of the first embodiment illustrated in FIG. 1, as well.

Third Embodiment

Figure 5:
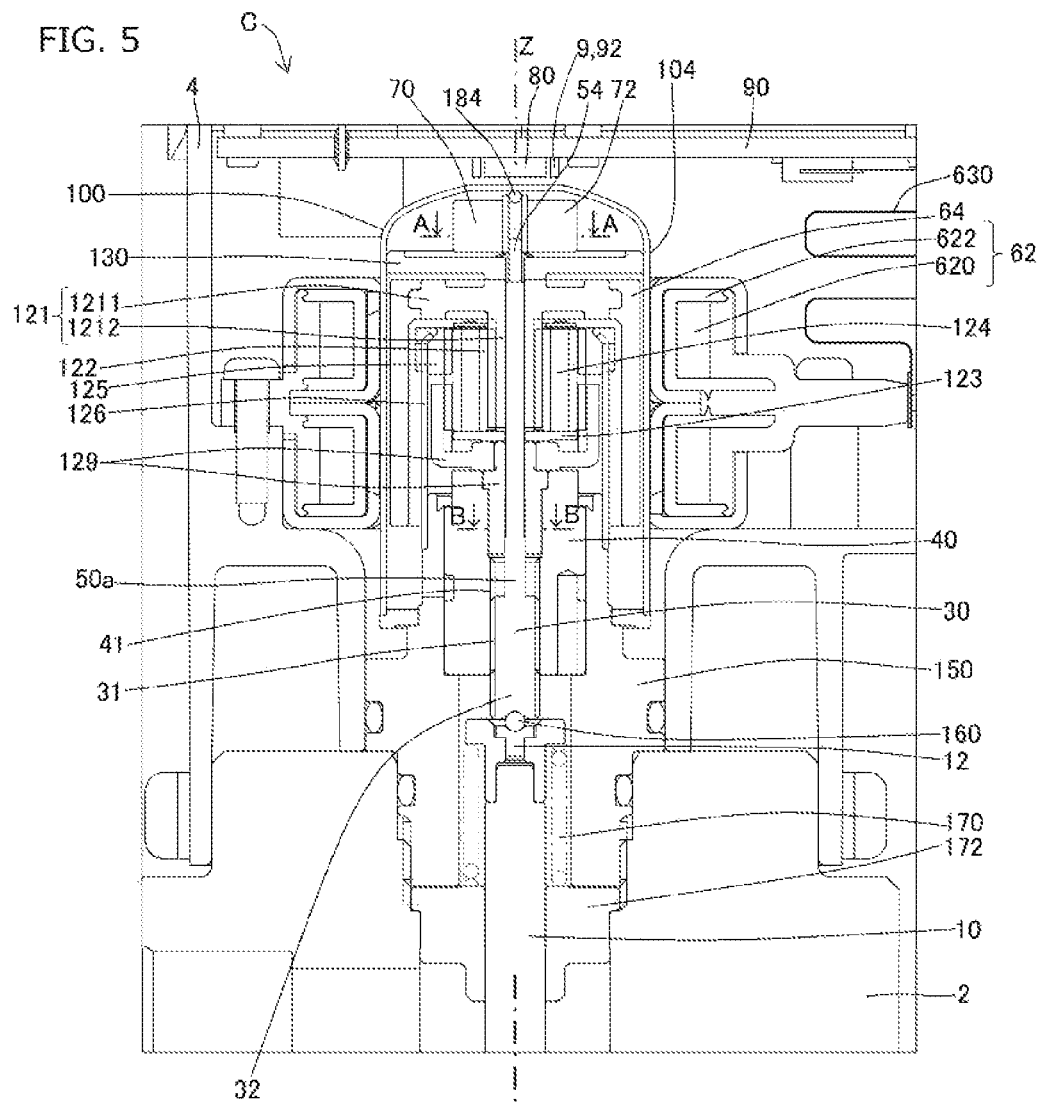
FIG. 5 is a schematic enlarged cross-sectional view of a portion of an electrically operated valve according to the third embodiment.
Figure 6:
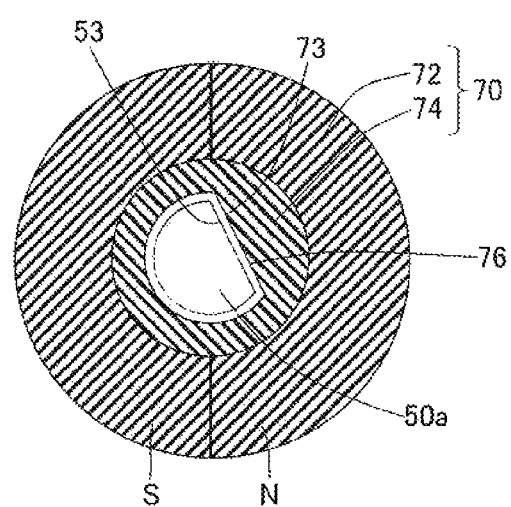
FIG. 6 is a cross-sectional view taken along the line A-A of FIG. 5.
Figure 7B:
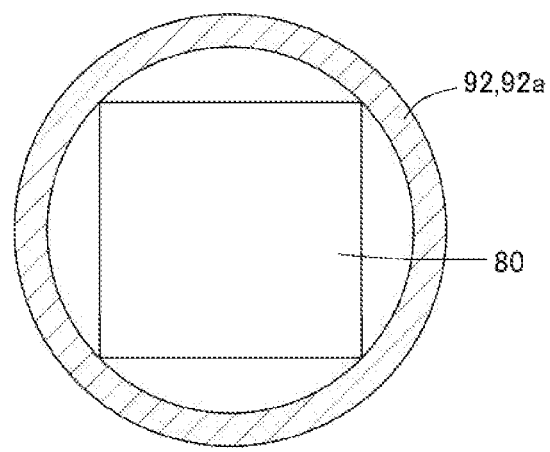
FIG. 7B is a cross-sectional view taken along the line K-K in FIG. 7A.
Figure 7C:
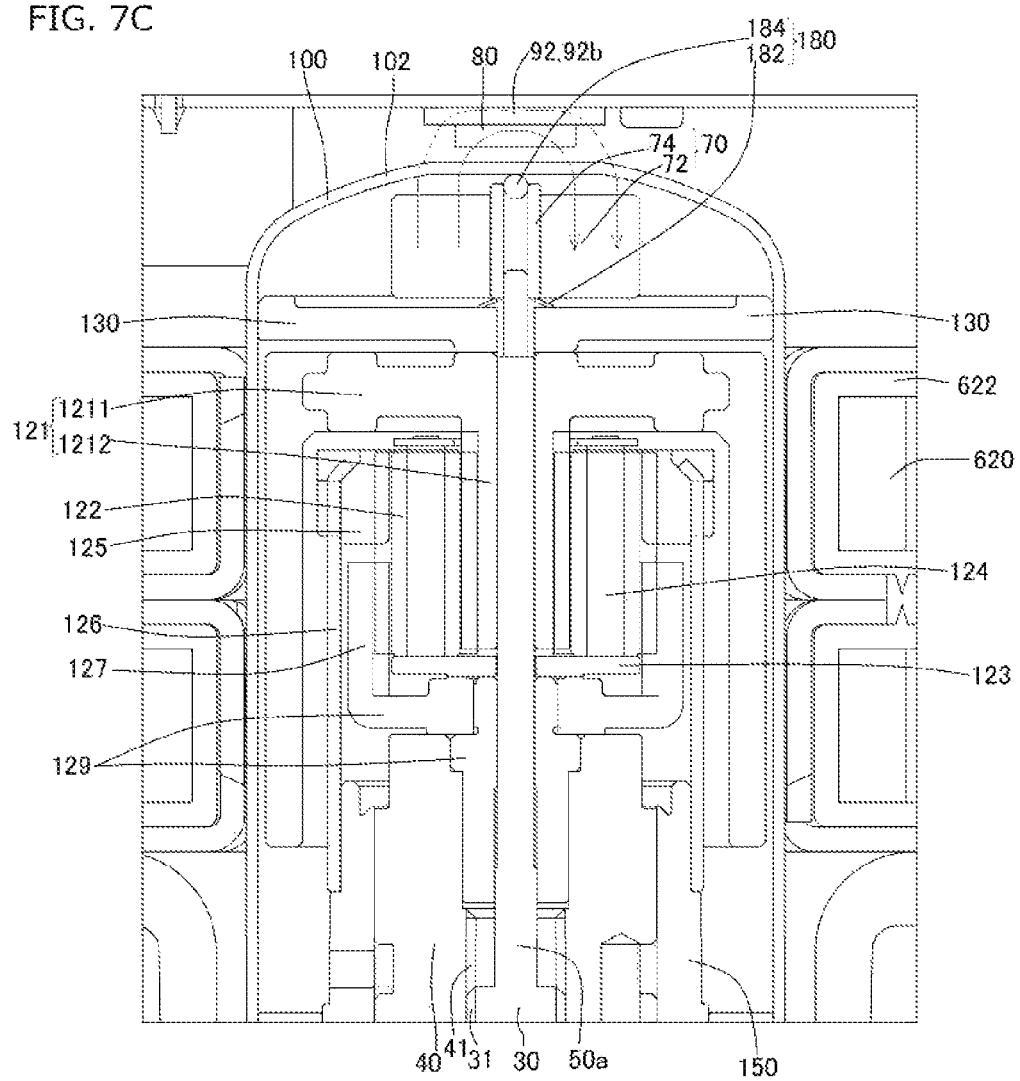
FIG. 7C is an enlarged view illustrating an overview of another embodiment of the configuration of the second yoke.
Figure 7D:
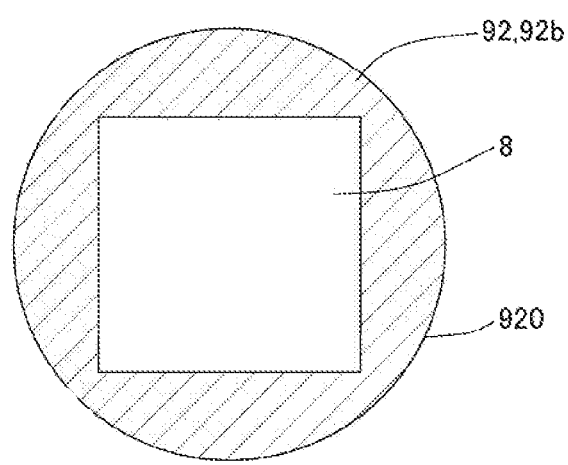
FIG. 7D is a bottom view of the second yoke and the angle sensor.
Figure 8:
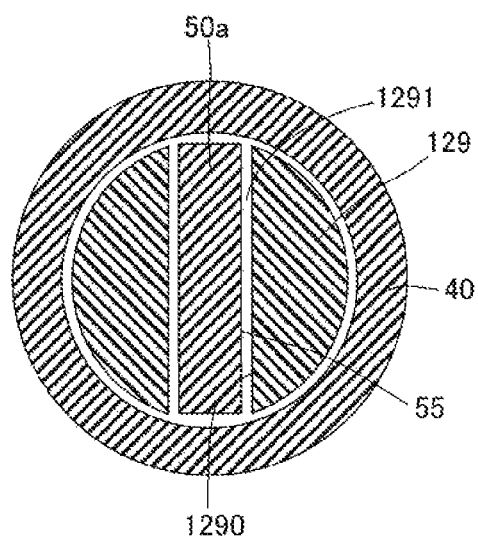
FIG. 8 is a cross-sectional view taken along the line B-B of FIG. 5.

Referring to FIG. 5 to FIG. 8, a description will be provided of an electrically operated valve C according to the third embodiment. FIG. 5 is a schematic enlarged cross-sectional view of a portion of the electrically operated valve B of the third embodiment. FIG. 6 is a cross-sectional view taken along the line A-A in FIG. 5. FIG. 7A is a further enlarged view of a portion of FIG. 5. FIG. 7B is a cross-sectional view taken along the arrow K-K in FIG. 7A. FIG. 7C is an enlarged view illustrating an overview of another exemplary configuration of the second yokes 92. FIG. 7D is a bottom view of the second yokes 92 and the angular sensor 80. FIG. 8 is a cross-sectional view taken along the line B-B in FIG. 5.

In the electrically operated valve C of the third embodiment, the configuration of the rotation shaft 50a, the configuration of the yoke 9, and the support mechanism of the permanent magnet member 70 are different from the configuration of the rotation shaft, the configuration of the yoke 9, and the support mechanism of the permanent magnet member in the first and second embodiments. Accordingly, in the third embodiment, the configuration of the rotation shaft 50a, the configuration of the yoke 9, and the support mechanism of the permanent magnet member 70 will be primarily described, and the description of other repeated configurations will be omitted.

In the second embodiment, the rotation shaft 50 is a member that does not move up and down with respect to the can 100, whereas in the third embodiment, the rotation shaft 50a is a member that moves up and down with respect to the can 100 and the permanent magnet member 70. It should be noted that in the third embodiment, as in the second embodiment, the permanent magnet member 70 is a member that does not move up and down with respect to the can 100.

Referring to FIG. 6, an example of a mechanism for allowing relative movement of the rotation shaft 50a with respect to the permanent magnet member 70 will be described. As illustrated in FIG. 6, the permanent magnet member 70 has a second engagement portion 73 that engages with the first engagement portion 53 of the rotation shaft 50a. The first engagement portion 53 and the second engagement portion 73 engage with each other (contact each other) when the rotation shaft 50a rotates about the first axis Z. In contrast, the first engagement portion 53 and the second engagement portion 73 do not engage with each other in the direction along the first axis Z. Accordingly, the rotation shaft 50a cannot rotate relative to the permanent magnet member 70, and can move up and down relative to the permanent magnet member 70.

As illustrated in FIG. 6, the permanent magnet member 70 may include a hole 76, which may be a through hole or a non-through hole. The cross-sectional shape of the hole portion 76 perpendicular to the first axis Z is a non-circular shape (for example, a letter D-shape). The cross-sectional shape of the portion of the rotation shaft 50a that enters the hole portion 76 is complementary to the wall surface defining the inner surface of the hole portion 76, and has a non-circular shape (for example, a letter D-shape).

In the example illustrated in FIG. 6, the permanent magnet member 70 includes a permanent magnet 72 and a collar member 74 fixed to the permanent magnet 72. The collar member 74 is disposed inside the permanent magnet 72 (on the radial direction inside). The collar member 74 is provided with the above-described second engagement portion 73.

In the example illustrated in FIG. 6, it is not the permanent magnet 72, but the collar member 74 that comes into contact with the rotation shaft 50*a*. Accordingly, the permanent magnet 72 is not worn by the contact between the rotation shaft 50*a* and the permanent magnet 72. The material of the collar member 74 is, for example, SUS304.

Next, a permanent magnet positioning member 180 that maintains a constant distance between the permanent magnet 72 and the angle sensor 80 will be described with reference to FIG. 7A. The permanent magnet positioning member 180 is disposed inside the can 100, which serves as a case. In the example illustrated in FIG. 7A, the permanent magnet positioning member 180 includes a ball 184 that functions as a bearing member and a leaf spring 182. In other words, the permanent magnet positioning member 180 is constituted by a ball 184 and a leaf spring 182 arranged so as to sandwich the permanent magnet member 70.

The ball 184 is disposed between the end wall 102 of the can 100 and the permanent magnet member 70. The ball 184 functions as a bearing for the permanent magnet member 70, and also functions as a positioning member that defines the vertical position of the permanent magnet member 70.

In the example illustrated in FIG. 7A, the leaf spring 182 is disposed between the partition member 130 (the bearing member) and the permanent magnet member 70. The leaf spring 182 biases the permanent magnet member 70 toward the end wall 102 of the can 100. It should be noted that, in order to account for the assembly error of the electrically operated valve C, there are cases in which the partition member 130 (bearing member) may be disposed so as to be movable up and down by a small distance with respect to the can 100. Since the leaf spring 182 urges the permanent magnet member 70 against the end wall 102 even when the partition member can move up and down with respect to the can 100, the vertical position of the permanent magnet member 70 is preferably maintained.

It should be noted that a suitable bearing member different from the ball 184 may be disposed between the end wall 102 of the can 100 and the permanent magnet member 70. In addition, instead of the leaf spring 182, an optional bearing member may be disposed between the partition member 130 and the permanent magnet member 70. Even in this case, the distance between the permanent magnet 72 and the angle sensor 80 is kept constant by the suitable bearing member.

In the examples illustrated in FIG. 5 to FIG. 7A, the rotation shaft 50*a* itself can move up and down. Accordingly, the rotation shaft 50*a* itself can be used as the driver 30. That is, the rotation shaft 50*a* has both a function of rotating the permanent magnet member 70 and a function as a driver for moving the valve body 10 toward the valve seat 20.

In the first and second embodiments, an example in which the rotation shaft 50 is fixed to the output gear has been described. In contrast, in the third embodiment, the output gear 129 and the rotation shaft 50*a* are not fixed to each other. Instead, the output gear 129 and the rotation shaft 50*a* are engaged with each other about the first axis Z so as not to be capable of rotation relative to each other.

Referring to FIG. 8, an example of an engagement mechanism for engaging the output gear 129 and the rotation shaft 50*a* so as not to be capable of rotation relative to each other will be described. FIG. 8 is a cross-sectional view taken along the line B-B in FIG. 5.

As illustrated in FIG. 8, the output gear 129 has a fourth engagement portion 1290 that engages with the third engagement portion 55 of the rotation shaft 50*a*. The third engagement portion 55 and the fourth engagement portion 1290 engage with each other (contact each other) when the rotation shaft 50*a* rotates about the first axis Z. In contrast, the third engagement portion 55 and the fourth engagement portion 1290 do not engage with each other in the direction along the first axis Z. Accordingly, the rotation shaft 50*a* cannot rotate relative to the output gear 129, and can move up and down relative to the output gear 129.

As illustrated in FIG. 8, the output gear 129 includes a rotation shaft receiving portion 1291, such as a hole or slit. The cross-sectional shape of the rotation shaft receiving portion 1291 is a non-circular shape (for example, a rectangular shape). The cross-sectional shape of the portion of the rotation shaft 50*a* that enters the rotation shaft receiving portion 1291 is complementary to the wall surface that defines the inner surface of the rotation shaft receiving portion 1291, and is a non-circular shape (for example, a rectangular shape).

As illustrated in FIG. 7A, the output gear 129 is rotatably supported about the first axis Z by a support member such as the guide member 40.

In the third embodiment, the output gear 129 is rotated by the power from the power source 60. As the power transmission mechanism from the power source 60 to the output gear 129, a power transmission mechanism such as the planetary gear mechanism described in the second embodiment may be utilized.

When the output gear 129 rotates, the rotation shaft 50*a* rotates. In the third embodiment, the rotation shaft 50*a* and the driver 30 are integrally formed as one member, or are integrally fixed to each other. In addition, a male thread 31 is provided on the outer peripheral surface of the driver 30, and the male thread 31 is screwed to a female thread 41 provided on the guide member 40 for guiding the driver.

Accordingly, when the rotation shaft 50*a* rotates, the rotation shaft 50*a* (the rotation shaft 50*a* including the driver) moves along the first axis Z. The rotation shaft 50*a* and the valve body 10 are mechanically connected to each other. Accordingly, when the rotation shaft 50*a* moves along the first axis Z, the valve body 10 also moves along the first axis Z.

With the above configuration, it is possible to drive the valve body 10 by using the power from the power source 60. The amount of movement of the valve body 10 in the direction along the first axis Z is proportional to the amount of rotation of the rotation shaft 50*a* and the permanent magnet 72. Accordingly, in the third embodiment, by measuring the rotation angle of the permanent magnet 72 about the first axis Z by the angle sensor 80, it is possible to accurately determine the position of the valve body 10 in the direction along the first axis Z. It should be noted that the electrically operated valve C may include a computing device that converts the angle data output from the angle sensor 80 into position data of the valve body 10 in the direction along the first axis Z; that is, opening degree data for the valve.

In the third embodiment, it is not necessary to fix the permanent magnet member 70 to the rotation shaft 50*a*. In addition, it is not necessary to fix the rotation shaft 50*a* to the output gear. Accordingly, it is possible to efficiently assemble the electrically operated valve C.

(Example of Yoke Configuration)

Referring to FIG. 7A and FIG. 7B, examples of the configuration of the yoke 9 in the third embodiment will be described. The electrically operated valve C includes a yoke 9 (second yoke 92) configured to cover a portion of the angle sensor 80. The second yoke 92 collects the magnetic flux from the permanent magnet 72. In addition, the second yoke 92 collects the magnetic flux generated by the coil 620, and shields the angle sensor 80 from the magnetic flux generated by the coil 620. As a result, the detection accuracy of the rotation angle of the permanent magnet 72 by the angle sensor 80 is improved.

In the example illustrated in FIG. 7A, among the magnetic flux from the permanent magnet 72, an outer magnetic flux susceptible to external magnetic fields (such as the magnetic field generated by the coils 620) is induced in a magnetic path in the second yoke 92. Among the magnetic flux from the permanent magnet 72, the angle sensor 80 primarily detects the inner magnetic flux which is less likely to be influenced by external magnetic fields (such as the magnetic field generated by the coil 620). Accordingly, noise included in the signal output from the angle sensor 80 (such as noise caused by the magnetic flux generated by the coil 620 or the like) is reduced.

It should be noted that, in the example described in FIG. 7A, the outer edge 920 of the second yoke 92 is located further inward than the outer edge 720 of the permanent magnet 72 in a plan view (or a bottom view). In other words, the outer edge 720 of the permanent magnet 72 surrounds the entire second yoke 92 in a plan view (or a bottom view). In this way, the magnetic flux from the outer portion of the permanent magnet 72 is effectively guided to the second yoke 92. Accordingly, the effect of reducing the noise included in the signal output from the angle sensor 80 is significant.

In the example illustrated in FIG. 7B, the second yoke 92 covers the entire side surface of the angle sensor 80 (in other words, the entire circumference of the angle sensor 80). Accordingly, the noise reduction effect is significant. In the example illustrated in FIG. 7B, the second yoke 92 is a ring-shaped yoke 92a. However, the shape of the second yoke 92 is not limited to a ring shape, as long as it covers the entire side surface of the angle sensor 80 (in other words, the entire circumference of the angle sensor 80). In addition, in the example illustrated in FIG. 7B, the corner of the angle sensor 80 contacts the inner surface of the second yoke 92, but the corner of the angle sensor 80 may be separated from the inner surface of the second yoke 92.

(Another Example of the Yoke Configuration)

Referring to FIG. 7C and FIG. 7D, another example configuration of the yoke 9 according to the third embodiment will be described. The electrically operated valve C includes a yoke 9 (a second yoke 92) configured to cover a part of the angle sensor 80. The second yoke 92 collects the magnetic flux from the permanent magnet 72. In addition, the second yoke 92 collects the magnetic flux generated by the coil 620, and shields the angle sensor 80 from the magnetic flux generated by the coil 620. As a result, the detection accuracy of the rotation angle of the permanent magnet 72 by the angle sensor 80 is improved.

In the example illustrated in FIG. 7C, among the magnetic flux from the permanent magnet 72, an outer magnetic flux susceptible to external magnetic fields (such as the magnetic field generated by the coils 620) is induced in a magnetic path in the second yoke 92. Among the magnetic flux from the permanent magnet 72, the angle sensor 80 primarily detects the inner magnetic flux which is less likely to be influenced by external magnetic fields (such as the magnetic field generated by the coil 620). Accordingly, noise included in the signal output from the angle sensor 80 (such as noise caused by the magnetic flux generated by the coil 620 or the like) is reduced.

In the examples illustrated in FIG. 7C and FIG. 7D, the second yoke 92 covers the top surface of the angle sensor 80 (more specifically, the entire top surface of the angle sensor 80). It should be noted that from the perspective of more effectively shielding the external magnetic field generated by the coil 620 or the like, it is preferable that the outer edge 920 of the second yoke 92 disposed on the upper surface of the angle sensor 80 surrounds the entire angle sensor 80 in a plan view (or a bottom view).

In the example illustrated in FIG. 7D, the second yoke 92 is a disk-shaped yoke 92b. However, the shape of the second yoke 92 is not limited to a disk shape, as long as it covers the upper surface of the angle sensor 80 (more specifically, the entire upper surface of the angle sensor 80).

In the examples illustrated in FIG. 7A to FIG. 7D, the lower surface of the angle sensor 80 is not covered by the yoke 9 (the second yoke 92) and is exposed.

It should be noted that the configurations of the yoke in the third embodiment (the example of the configuration of the yoke and another example of the configuration of the yoke) may be utilized as the configuration of the yoke in the first embodiment, or may be utilized as the configuration of the yoke in the second embodiment.

(Example of Angle Sensor)

An example of the angle sensor 80 of each embodiment will be described with reference to FIG. 9 to FIG. 12. FIG. 9 to FIG. 12 are diagrams schematically illustrating the placement relationship between the permanent magnet 72 and the angle sensor 80, in which a bottom view is illustrated on the top side and a partially cut-away perspective view is illustrated on the lower side.

As illustrated in FIG. 9, the permanent magnet 72 has a north pole and a south pole in a top view. In the example illustrated in FIG. 9, in the top view, the number of north poles of the permanent magnet 72 is one, and the number of south poles of the permanent magnet 72 is one. Alternatively, the number of north poles of the permanent magnet and the number of south poles of the permanent magnet may be two or more, respectively, in the top view. In the example illustrated in FIG. 9, the permanent magnet 72 includes an interface plane 78 between the north pole and the south pole, and this interface plane 78 is a plane perpendicular to the first axis Z, passing through the first axis Z coinciding with the central axis of the rotation shaft (50; 50a). The north pole is disposed on one side of the interface plane 78, and the south pole is disposed on the other side of the interface plane 78. It should be noted that the permanent magnet 72 is, for example, a magnet having a disk shape. In addition, the permanent magnet 72 may be a plastic magnet obtained by molding a mixture of magnetic powder and a resin binder.

The angle sensor 80 is disposed above the permanent magnet 72. In the example illustrated in FIG. 9, the angle sensor 80 is located on an extension of the rotation shaft (50; 50a); that is, on the first axis Z. The angle sensor 80 includes at least one magnetic detection element 82 (for example, a Hall element, a magnetoresistive element, or the like), and more preferably includes two or more or three or more magnetic detection elements.

In the example illustrated in FIG. 9, the angle sensor 80 includes four magnetic detection elements (82a to 82d). The magnetic detection elements (82a to 82d) may be elements for detecting a component of the magnetic flux in the direction along the first axis Z. In FIG. 9, the magnetic detection element 82a and the magnetic detection element 82d detect the magnetic flux component in the +Z direction, and the magnetic detection element 82b and the magnetic detection element 82c detect the magnetic flux component in the −Z direction. When the magnitude of the magnetic flux detected by the magnetic detection element 82a (or magnetic detection element 82*b*) and the magnitude of the magnetic flux detected by the magnetic detection element 82*d* (or magnetic detection element 82*c*) are equal, the interface plane 78 is perpendicular to the X-axis. At this time, the angle sensor 80 determines that the rotation angle of the permanent magnet 72 is, for example, 0 degrees.

As illustrated in FIG. 10, it is assumed that the permanent magnet 72 rotates in the R direction. In FIG. 10, the magnetic detection element 82*a* and the magnetic detection element 82*d* detect the magnetic flux component in the +Z direction, and the magnetic detection element 82*b* and the magnetic detection element 82*c* detect the magnetic flux component in the −Z direction. As the state illustrated in FIG. 9 shifts to the state illustrated in FIG. 10, the magnitude of the magnetic flux detected by the magnetic detection element 82*b* and the magnetic detection element 82*d* increases, and the magnitude of the magnetic flux detected by the magnetic detection element 82*a* and the magnetic detection element 82*c* decreases. For example, based on the ratio of the magnitude of the magnetic flux detected by the magnetic detection element 82*a* to the magnitude of the magnetic flux detected by the magnetic detection element 82*d*, and the ratio of the magnitude of the magnetic flux detected by the magnetic detection element 82*a* to the magnitude of the magnetic flux detected by the magnetic detection element 82*b*, the angle sensor 80 can determine the inclination of the magnetic force line with respect to the X-axis; that is, the rotation angle of the permanent magnet 72.

Figure 11:
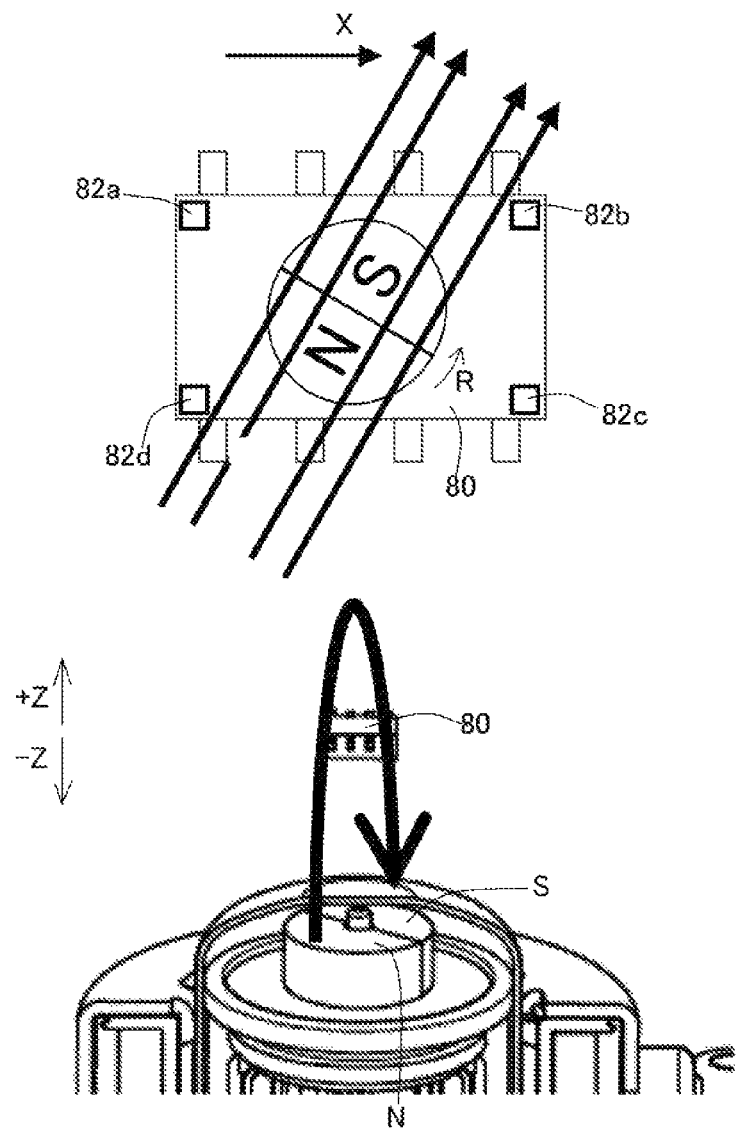
FIG. 11 is a diagram schematically illustrating the placement relationship between the permanent magnet and the angle sensor.

As illustrated in FIG. 11, it is assumed that the permanent magnet 72 further rotates in the R direction. In FIG. 11, the magnetic detection element 82*d* detects the magnetic flux component in the +Z direction, and the magnetic detection element 82*b* detects the magnetic flux component in the −Z direction. As the state illustrated in FIG. 10 shifts to the state illustrated in FIG. 11, the magnitude of the magnetic flux detected by the magnetic detection element 82*b* and the magnetic detection element 82*d* decreases. Further, the magnitude of the magnetic flux detected by the magnetic detection elements 82*a* and 82*c* decreases. For example, based on the ratio of the magnitude of the magnetic flux detected by the magnetic detection element 82*a* to the magnitude of the magnetic flux detected by the magnetic detection element 82*d*, and the ratio of the magnitude of the magnetic flux detected by the magnetic detection element 82*a* to the magnitude of the magnetic flux detected by the magnetic detection element 82*b*, the angle sensor 80 can determine the inclination of the magnetic force line with respect to the X-axis; that is, the rotation angle of the permanent magnet 72.

Figure 12:
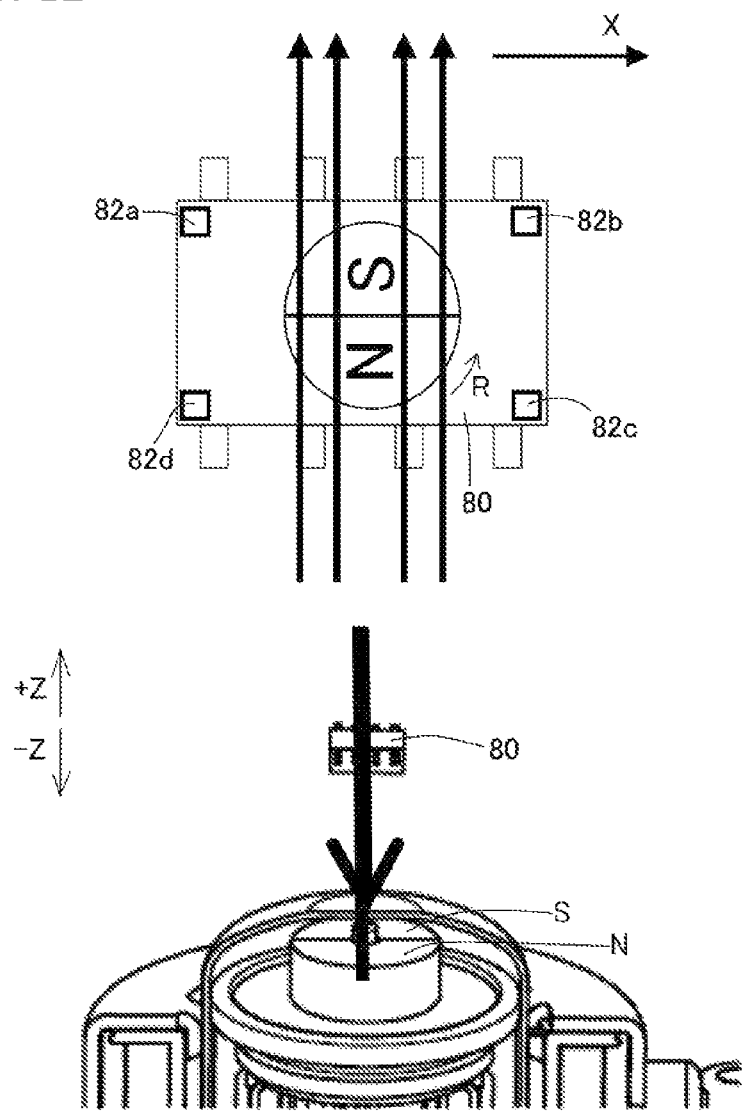
FIG. 12 is a diagram schematically illustrating the placement relationship between the permanent magnet and the angle sensor.

As illustrated in FIG. 12, it is assumed that the permanent magnet 72 further rotates in the R direction. In FIG. 12, the magnetic detection element 82*c* and the magnetic detection element 82*d* detect the magnetic flux component in the +Z direction, and the magnetic detection element 82*a* and the magnetic detection element 82*b* detect the magnetic flux component in the −Z direction. As the state shifts from the state illustrated in FIG. 11 to the state illustrated in FIG. 12, the magnitude of the magnetic flux detected by the magnetic detection element 82*a* and the magnetic detection element 82*c* increases, and the magnitude of the magnetic flux detected by the magnetic detection element 82*b* and the magnetic detection element 82*d* decreases. For example, based on the ratio of the magnitude of the magnetic flux detected by the magnetic detection element 82*a* to the magnitude of the magnetic flux detected by the magnetic detection element 82*d*, and the ratio of the magnitude of the magnetic flux detected by the magnetic detection element 82*a* to the magnitude of the magnetic flux detected by the magnetic detection element 82*b*, the angle sensor 80 can determine the inclination of the magnetic force line with respect to the X-axis; that is, the rotation angle of the permanent magnet 72.

As can be seen from FIG. 9 to FIG. 12, the angle sensor 80 can detect the inclination of the permanent magnet 72 with respect to the X-axis; that is, the absolute rotation angle of the permanent magnet 72. Put differently, even when the permanent magnet 72 does not rotate, the angle sensor 80 can calculate the inclination (that is, the rotation angle) of the permanent magnet 72 with respect to the X-axis. The calculation of the rotation angle is performed based on, for example, the direction of the magnetic flux passing through at least three of the magnetic detection elements 82 and the magnitude of the magnetic flux passing through at least three of the magnetic detection elements 82.

In the examples illustrated in FIG. 9 to FIG. 12, the angle sensor 80 can detect the absolute rotation angle of the permanent magnet 72. Accordingly, even when the power of the electrically operated valve is turned off and the rotation angle information of the permanent magnet 72 is lost, when the power is turned on again, the angle sensor 80 can immediately obtain (output) the rotation angle of the permanent magnet 72.

In the examples illustrated in FIG. 9 to FIG. 12, it is described that each of the magnetic detection elements detects a flux component in the direction along the first axis (Z axis). Alternatively, each of the magnetic detection elements may detect a flux component in the direction along the X axis and/or in the direction along the Y axis perpendicular to the X axis and the Z axis.

It should be noted that each of the permanent magnet 72 and the angle sensor 80 described with reference to FIG. 9 to FIG. 12 can be utilized in the electrically operated valve of the first and second embodiments or the electrically operated valve in the third embodiment.

The present invention is not limited to the above-described embodiments. Within the scope of the present invention, it is possible to freely combine the above-described embodiments, to modify any component of each embodiment, or to omit any component in each embodiment.

REFERENCE SIGNS LIST

A, B, C: Electrically operated valve
2: Lower base member
4: Housing member
4*a*: Cylindrical member
4*b*: Cover member
10: Valve body
12: Upper end
20: Valve seat
30: Driver
31: Male thread
32: Lower end
34: Upper end
40: Guide member
41: Female thread
50: Rotation shaft
50*a*: Rotation shaft
52: Second end
53: First engagement portion
54: First end
55: Third engagement portion
60: Power source 62: Stator member
64: Rotor member
70: Permanent magnet member
72: Permanent magnet
73: Second engagement portion
74: Collar member
76: Hole
78: Interface plane
80: Angle sensor
81: Outer edge
82: Magnetic detection element
82a-82d: Magnetic detection element
90: Control substrate
91: First yoke
91a: South-pole side yoke
91b: North-pole side yoke
92: Second yoke
92a: Ring-shaped yoke
92b: Disk-shaped yoke
100: Can
102: End wall
104: Sidewall
112: First flow path
113: Valve chamber
114: Second flow path
120: Power transmission mechanism
121: Sun gear member
122: Planetary gear
123: Carrier
124: Shaft
125: Ring gear
126: Support member
127: Second ring gear
129: Output gear
130: Partition member
150: Holder
152: First seal member
154: Second seal member
160: Ball
170: Spring member
172: Spring bearing member
180: Permanent magnet positioning member
182: Leaf spring
184: Ball
620: Coil
622: Bobbin
630 Wire
720: Outer edge
910: Outer edge
920: Outer edge
1211: Connection
1212: Sun gear
1290: Fourth engagement portion
1291: Rotation shaft receiving portion

The invention claimed is:

1. An electrically operated valve comprising:
a valve body;
a driver configured to move the valve body along a first axis;
a rotation shaft configured to rotate the driver around the first axis;
a permanent magnet member disposed on the rotation shaft and configured to rotate with the rotation shaft;
an angle sensor disposed above a permanent magnet included in the permanent magnet member and configured to detect a rotation angle of the permanent magnet;
a sensor yoke configured to cover a portion of the angle sensor; and
a case configured to contain the permanent magnet member,
wherein an end wall of the case is disposed between the angle sensor and the permanent magnet member,
the sensor yoke is configured to cover an upper surface or a side surface of the angle sensor, and an outer edge of the sensor yoke is located further inward than an outer edge of the permanent magnet in a plan view.

2. The electrically operated valve according to claim 1, further comprising:
a magnet yoke configured to cover a portion of the permanent magnet; and
the magnet yoke is configured to cover a side surface of the permanent magnet.

3. The electrically operated valve according to claim 2, wherein a boundary region between a north pole and a south pole of the side surface of the permanent magnet is exposed without being covered by the magnet yoke.

4. The electrically operated valve according to claim 3, wherein the permanent magnet member is an insert molded body that includes the permanent magnet and the magnet yoke.

5. The electrically operated valve according to claim 2, wherein the permanent magnet member is an insert molded body that includes the permanent magnet and the magnet yoke.

6. The electrically operated valve according to claim 1, wherein a lower surface of the angle sensor is exposed without being covered by the sensor yoke.

7. The electrically operated valve according to claim 1, further comprising:
a stator member that includes a coil;
a rotor member coupled to the rotation shaft so as to enable power transmission; and
a lower base member having a valve seat.

8. The electrically operated valve according to claim 1, further comprising a control substrate configured to control a rotational movement of the rotation shaft.

* * * * *